(12) United States Patent
Aerts et al.

(10) Patent No.: US 10,780,909 B2
(45) Date of Patent: Sep. 22, 2020

(54) USER INTERFACE FOR STEERING WHEEL

(71) Applicant: Tesla, Inc., Palo Alto, CA (US)

(72) Inventors: Joris Aerts, Amsterdam (NL); Felix Louis Godard, Los Angeles, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 16/054,647

(22) Filed: Aug. 3, 2018

(65) Prior Publication Data
US 2020/0039558 A1  Feb. 6, 2020

(51) Int. Cl.
*B62D 1/04* (2006.01)
*G06F 3/0488* (2013.01)
*G06F 3/01* (2006.01)

(52) U.S. Cl.
CPC .............. *B62D 1/046* (2013.01); *G06F 3/017* (2013.01); *G06F 3/0488* (2013.01); *B60K 2370/1446* (2019.05); *B60K 2370/782* (2019.05)

(58) Field of Classification Search
CPC ....... B62D 1/046; G06F 3/017; G06F 3/0488; B60K 35/00; B60K 2350/1036; B60K 2350/928; B60K 2370/782; B60K 2370/1446; B60R 2021/21543
See application file for complete search history.

(56) References Cited

U.S. PATENT DOCUMENTS

| | | | |
|---|---|---|---|
| 7,680,574 B2 * | 3/2010 | Berg | B60K 35/00 345/173 |
| 8,061,861 B2 * | 11/2011 | Paxton | B60Q 3/283 362/84 |
| 8,067,709 B2 * | 11/2011 | Han | B62D 1/046 200/336 |
| 8,406,961 B2 | 3/2013 | Pathak et al. | |
| 8,432,372 B2 * | 4/2013 | Butler | G06F 1/1626 178/18.03 |
| 8,643,628 B1 * | 2/2014 | Eriksson | G06F 1/169 345/173 |
| 8,775,023 B2 * | 7/2014 | Frojdh | G06F 3/017 701/36 |
| 8,886,407 B2 * | 11/2014 | Sivertsen | B60K 35/00 701/41 |
| 9,092,093 B2 * | 7/2015 | Jubner | B62D 1/046 |
| 9,110,537 B2 * | 8/2015 | Sanma | G06F 3/0418 |
| 9,238,409 B2 * | 1/2016 | Lathrop | B60K 37/06 |
| 9,254,859 B2 * | 2/2016 | Eckstein | B60K 31/042 |
| 9,463,793 B2 * | 10/2016 | Lind | B60W 30/00 |
| 9,499,110 B2 * | 11/2016 | Takahashi | B60R 1/12 |

(Continued)

FOREIGN PATENT DOCUMENTS

JP  2014-102660  6/2014

OTHER PUBLICATIONS

International Search Report and Written Opinion dated Nov. 15, 2019 in application No. PCT/US2019/044601.

*Primary Examiner* — Adam D Rogers
(74) *Attorney, Agent, or Firm* — Knobbe, Martens Olson & Bear, LLP

(57) ABSTRACT

An interactive user interface for a steering wheel is provided. A user interface is provided on one or more portions of the steering wheel. The user interface recognizes gesture movements made by a user thereon. The user interface allows navigation of a set of controls associated with a menu provided through the user interface based on the recognized gesture movements.

20 Claims, 10 Drawing Sheets

(56) References Cited

U.S. PATENT DOCUMENTS

| | | | | |
|---|---|---|---|---|
| 9,776,513 | B2* | 10/2017 | Ha | B60K 37/06 |
| 9,801,034 | B2* | 10/2017 | Kim | H04W 4/12 |
| 10,029,723 | B2* | 7/2018 | Kim | B62D 1/046 |
| 10,036,843 | B2* | 7/2018 | Lisseman | G02B 6/0085 |
| 10,067,567 | B2* | 9/2018 | Andrews | G06F 3/016 |
| 10,086,753 | B2* | 10/2018 | Ebina | B62D 1/28 |
| 2009/0223321 | A1* | 9/2009 | Stefani | B62D 1/046 |
| | | | | 74/552 |
| 2010/0194080 | A1 | 8/2010 | Paxton et al. | |
| 2011/0030502 | A1 | 2/2011 | Lathrop | |
| 2011/0169750 | A1* | 7/2011 | Pivonka | B60K 35/00 |
| | | | | 345/173 |
| 2015/0041299 | A1* | 2/2015 | Suzuki | H01H 3/0213 |
| | | | | 200/5 A |
| 2015/0066245 | A1 | 3/2015 | Lee et al. | |
| 2016/0375924 | A1* | 12/2016 | Bodtker | B62D 1/046 |
| | | | | 74/552 |
| 2017/0211781 | A1* | 7/2017 | Sun | G02B 27/20 |
| 2017/0269704 | A1* | 9/2017 | Akita | G06F 9/451 |
| 2017/0369022 | A1* | 12/2017 | Kanto | B60R 21/215 |
| 2018/0231976 | A1* | 8/2018 | Singh | G06K 9/00791 |
| 2018/0354543 | A1* | 12/2018 | Nishio | B62D 1/046 |
| 2019/0001901 | A1* | 1/2019 | Verwys | B60R 13/005 |
| 2019/0212910 | A1* | 7/2019 | Abt | G06F 3/04883 |

* cited by examiner

*FIG. 3A*

| | | Function | Visual Feedback Steering | Visual Feedback | Sound Feedback |
|---|---|---|---|---|---|
| DOUBLE TAP | | ENTER PERIPHERAL UI | + ∧ ∨ − all light out | Pop Up | Piezo Noise Enter Note |
| HOVER LEFT | | SELECT PERIPHERAL CLIMATE | + ∧ ∨ − all light out | Pop Up LEFT | Hover Note |
| HOVER RIGHT | | SELECT PERIPHERAL CALLS | + ∧ ∨ − all light out | Pop Up RIGHT | Hover Note |
| HOVER OUT | | EXIT (back to volume) | + ∧ ∨ − all light out | Wash Out Pop Up | Exit Note |

USER INTERFACE FOR STEERING WHEEL

TECHNICAL FIELD

The present disclosure relates to a user interface. More particularly, the present disclosure relates to a user interface for a steering wheel.

BACKGROUND

Steering wheels are provided in a number of automotive applications to allow a driver to maneuver a vehicle. Current steering wheels are primarily used to control a movement of the vehicle. However, there are many other functionalities that the driver may need to change or update while driving, for example selecting auto-pilot mode, and so on. In such a situation, the driver may need to use other interfaces to manipulate these functionalities. This may sometimes cause the driver to be inconvenienced. For example, the driver may need to move in order to access controls that are located at different areas of the vehicle, that may not be near the steering wheel, in order to change, update or access these functionalities.

Hence, there is a need for an improved user interface for vehicles that overcome the aforementioned drawbacks.

SUMMARY

The present disclosure introduces an interactive user interface for a steering wheel. The user interface is provided on at least one portion of the steering wheel. The user interface recognizes gesture movements made by a user and allows navigation of a set of controls associated with a menu based on the gesture movements made by the user.

In another embodiment, the user interface positioned on the steering wheel provides feedback to the user, indicative of selection or change in functionality as selected by the user through the user interface. In yet another embodiment, the user interface positioned on the steering wheel recognizes gesture movements made by the user, allows navigation of a menu of controls through the gesture movements, and provides feedback to the user through the user interface.

In one embodiment, the user interface is embodied as trackpads that are provided on two diametrically opposite portions of the steering wheel. The user interface recognizes different gesture movements made by the user, for example, touch, double tap, swipe, and so on. Based on the gesture movements performed on and recognized by the user interface, the user may navigate through a set of controls that are associated with the vehicle or devices that are connected to the vehicle, such as a tablet, a smartphone, and so on. Further, based on the selection made by the user, the user interface provides different haptic and/or visual feedback through the steering wheel itself, specifically by providing feedback of the selection made by the user such that the feedback provided is perceptible by the user's digits (fingers or thumbs). In some cases, a peripheral console may be provided proximate to the steering wheel, such that the peripheral console provides an easy to perceive image or color block of the control selected by the user through the steering wheel menu recognition functionality.

BRIEF DESCRIPTION OF THE FIGURES

FIGS. 3A to 3F illustrate various exemplary functionality navigations through recognition of user gestures on the user interface of the steering wheel of FIG. 2 according to certain embodiments of the invention.

Figure 1:
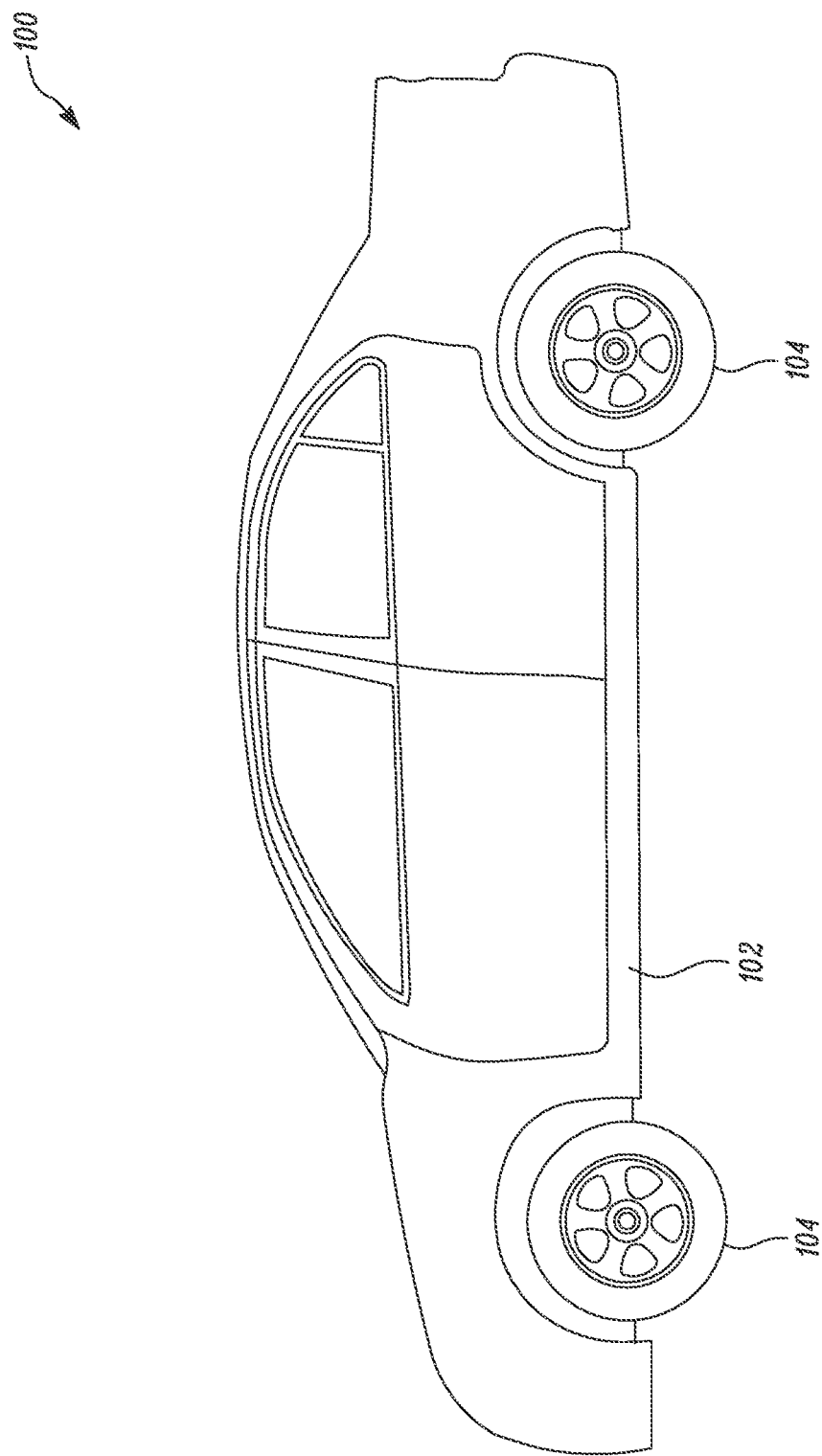
FIG. 1 illustrates a side profile of an exemplary vehicle according to certain embodiments of the invention.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting it.

DETAILED DESCRIPTION

FIG. 1 illustrates a side profile of an exemplary vehicle 100 such as, for example, a passenger car, truck, sport utility vehicle, or van. The vehicle 100 includes a frame 102 that is supported by a set of wheels 104. The vehicle 100 includes a power source (not shown) configured to propel the vehicle 100.

Figure 2:
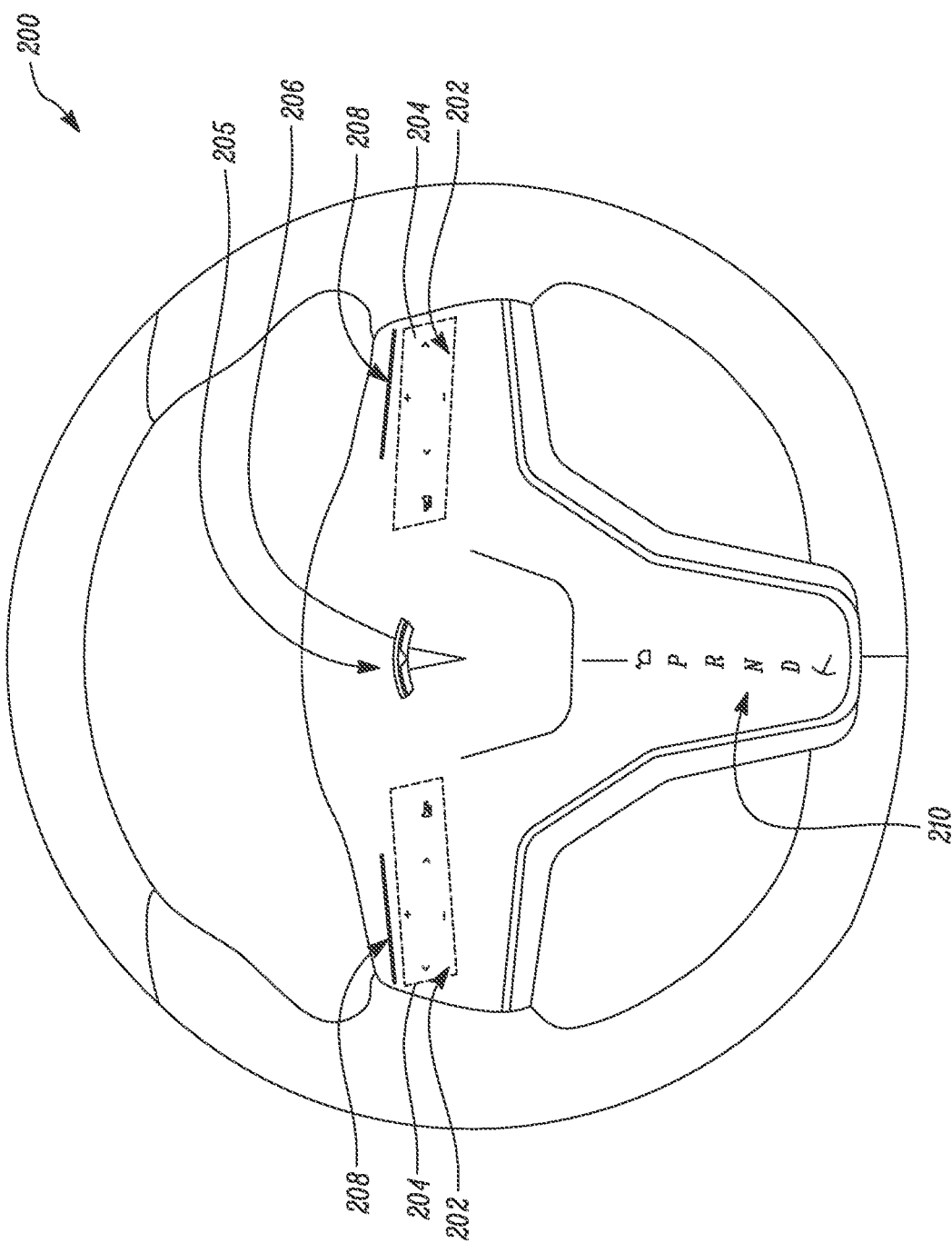
FIG. 2 illustrates a front view of an exemplary steering wheel having a user interface according to certain embodiments of the invention.

The vehicle 100 has a steering wheel 200 (see FIG. 2) for allowing a user to maneuver the vehicle 100. Referring to FIG. 2, the steering wheel 200 includes a user interface 202 provided on one or more portions of the steering wheel 200. For example, the user interface 202 is provided on diametrically opposite locations of the steering wheel 200. Alternatively, the user interface 202 may be provided on a central portion 205 of the steering wheel 200. The user interface 202 may be embodied as a touch pad or a trackpad 204 (see dotted lines). The trackpad 204 may be integrated into the steering wheel using known techniques. Alternatively, the user interface 202 may be embodied as a set of buttons provided on the steering wheel 200. The user interface 202 is provided in such a manner that the user interface 202 may be easily accessed by thumbs or fingers of the user without having to disengage contact from the steering wheel 200 while driving.

By interacting with the user interface 202 provided on the steering wheel 200, the user may able to select, update, and/or navigate through a menu of controls. Further, based on the gestures performed on and recognized by the user interface 202, the user may also receive feedback of the selections made with respect to the set or menu of controls. This interaction of the user may be manifested through gesture movements made directly on the user interface 202 and/or based on indication of the user's intention to interact with the user interface 202 that may be estimated by ascertaining when the user's digits approach the user interface 202. For example, through proximity sensors, the user interface 202 may sense that the user's digit is approaching a control manipulation functionality on the user interface 202, causing the user interface 202 to provide feedback to the user.

The gesture movements may include swipe, touch, click, single tap, double tap, or pinch-in, pinch-out or any other gesture or combination of gestures. The user interface 202 recognizes various gesture movements provided by the user and accordingly allows the user to navigate through the menu of controls. These controls may include controls associated with the vehicle 100 itself or with other devices that are connected to the vehicle 100. For example, a tablet or smartphone may be connected to the vehicle 100 through known short distance communication techniques, such as Bluetooth technology. In another example, multiple or complex gestures may be recognized by the user interface 202 to allow the user to interact with air-vent control of the vehicle 100 through the user interface 202. Exemplary gestures will be explained in detail in connection with FIGS. 3A to 3F later in this section.

Further, the user interface 202 of the steering wheel 200 also provides visual and/or haptic feedback to the user indicative of selections made by the user. For example, a badge 206 206 at the central portion 205 located on a front face of the steering wheel 200 may illuminate to indicate different interactions of the user with respect to auto-pilot functionality of the vehicle 100. In another example, flashing of colors on the badge 206 and/or at different locations on the steering wheel 200 indicate different states associated with the auto-pilot functionality including, but not limited to, not engaged, not able to engage, engaged, and warning to hold on to the steering wheel 200. In this case, based on the current state of the auto-pilot, an appropriate color or flashing of the badge 206 may be used to indicate the activated state to the user through the steering wheel 200. Additionally, the steering wheel 200 may also include lights present at other portions 208 of the steering wheel 200 that may illuminate to indicate that the controls mapped to respective trackpads 204 are currently being navigated by the user.

The user interface 202 of the steering wheel 200 may additionally include indicators 210 provided at a lower portion of the steering wheel 200 indicative of a selected gear engagement of the vehicle 100. For example, the user interface 202 may provide illuminated indications of engagement of Park, Reverse, Neutral or Drive modes. Additionally or optionally, the steering wheel 200 may include RFID detection and NFC activation functionality.

Figure 3A:
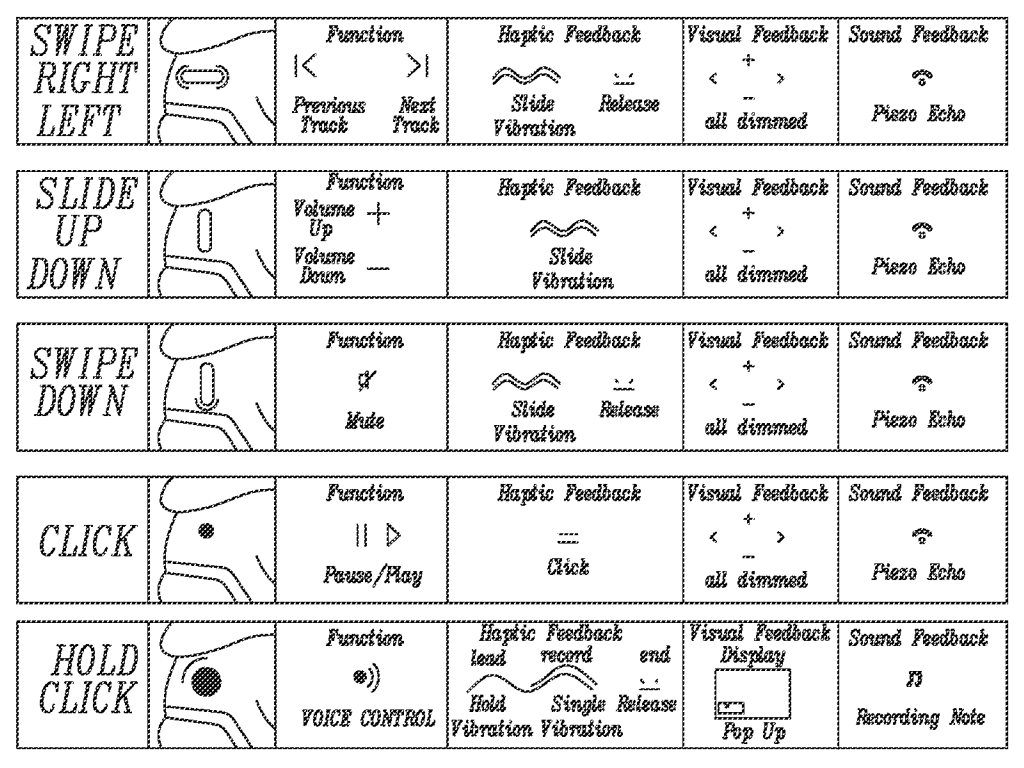
Figure 3C:
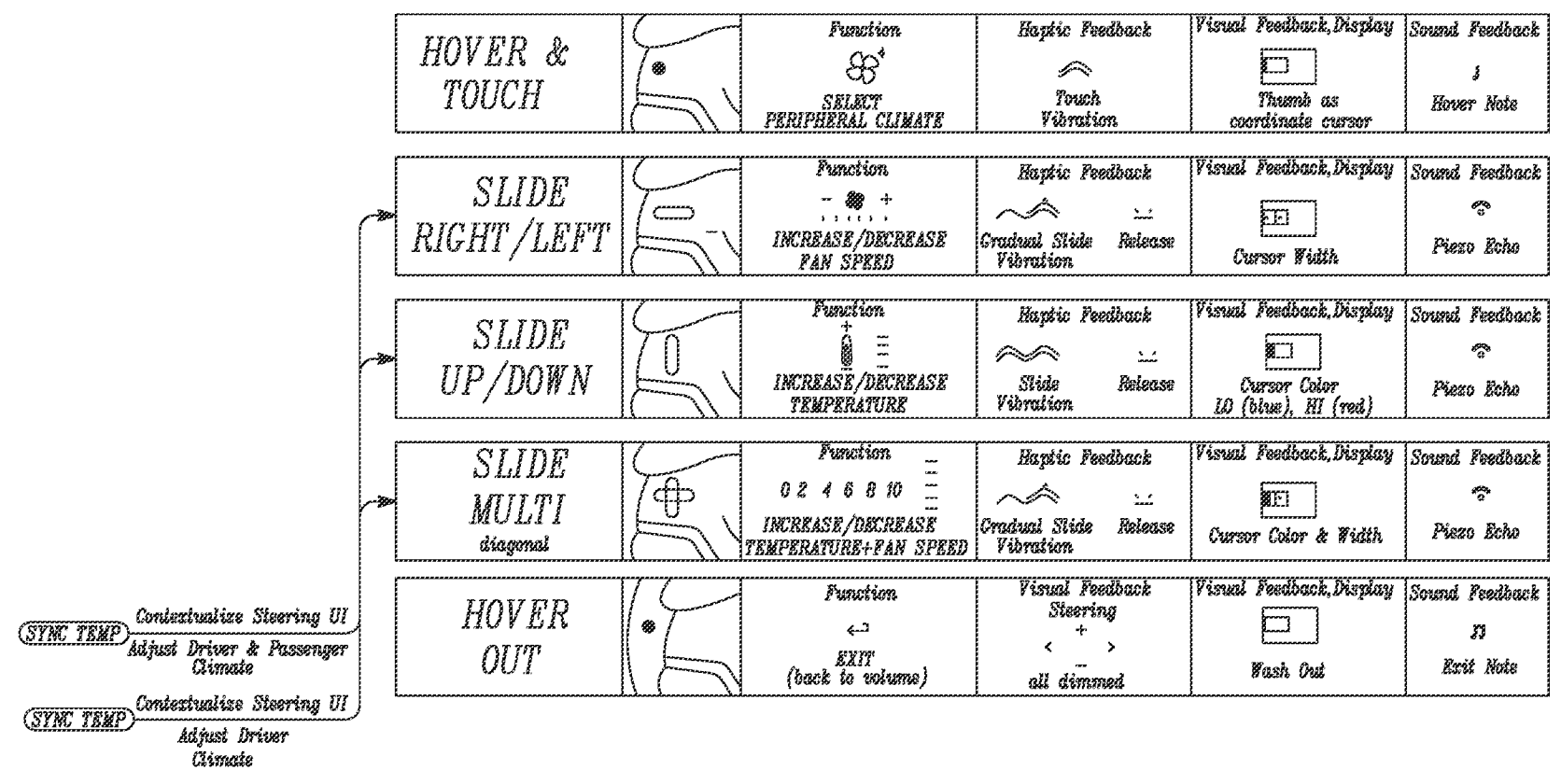
Figure 3D:

Referring to FIGS. 3A to 3F exemplary mappings of user gesture movements and the change in functionality, visual feedback, and haptic feedback is provided. As shown in FIGS. 3A to 3D exemplary navigation techniques using the user interface 202 on a left-hand side of the steering wheel 200 is illustrated. More particularly, as illustrated in FIG. 3A, the user may navigate through different music functionalities such as track change, volume up or down, mute or unmute, pause or play, and voice activation by swiping right, sliding up and down, swiping down, clicking, and hold clicking respectively. The user interface 202 provides feedback of the selection of a given functionality and/or change in value (that is increase or decrease) of the selected functionality that are selectable through the user interface 202. For example, the user may receive an appropriate visual feedback through illuminated indicators for each of the selections made.

Further, the user interface 202 may also provide haptic feedback to the user through the user's digit that is interacting with the user interface 202. For example, if the user uses his thumb to interact with the user interface 202, then the haptic feedback may be provided into the thumb of the user. The intensity and duration of the haptic feedback provided may vary based on the nature or type of the feedback that the user interface 202 is designed to provide for the given functionality. For example, shorter or longer bursts of haptic feedback pulses, closer or more spaced apart bursts of the haptic feedback pulses, varying intensity the haptic feedback pulses, and so on. The haptic feedback provided by the user interface 202 may convey information to the user of the current settings of the system associated with the respective functionality. For example, the haptic feedback provided through the user interface 202 may change in amplitude as functionality is increased or decreased. In this case, if the user decreases a following distance in the auto-pilot mode, the haptic feedback may increase in frequency and/or intensity indicating appropriate changes in system settings based on the user input. Referring to FIG. 3A, exemplary haptic feedbacks including slide vibration, release, click, hold vibration, and single vibration are illustrated based on when the user attempts to interact with the music selection menu functionality.

Similarly, as shown in FIG. 3B, the user may use double tap, hover left, hover right, and/or hover out gestures to enter peripheral user interface 202, select peripheral climate, select peripheral calls, and exit function controls respectively based on the gestures made. The user interacts by performing any of the mentioned gestures on the user interface 202 provided on left side of the steering wheel 200. The user interface 202 provides visual and audio indications of the selections made by the user. In some cases, the user interface 202 may additionally provide haptic feedback of the selections made.

Referring to FIG. 3C, the user may use hover and touch, slide left or right, slide up or down, slide multi-diagonal, or hover gestures to navigate select peripheral climate, increase or decrease fan speed, increase or decrease temperature, increase or decrease temperature and fan speed, or exit function controls respectively based on the gestures made. The user interacts by performing any of the mentioned gestures on the left user interface 202 provided on the steering wheel 200. The user interface 202 provides visual and audio indications of the selections made by the user. In some cases, the user interface 202 may additionally provide haptic feedback of the selections made for example, touch vibrations, gradual slide vibrations, slide vibrations, and/or release based on the gesture movements made by the user for adjusting driver or passenger climate.

Referring to FIG. 3D, the user may use hover and touch, slide left, or hover out to navigate through several calling option functionalities, particularly, selecting peripheral calling, scrolling recent calls made, calling hanging up, or exiting from the calling menu options. The user interacts by performing any of the mentioned gestures on the left user interface 202 provided on the steering wheel 200. The user interface 202 provides visual and audio indications of the selections made by the user. In some cases, the user interface 202 may additionally provide haptic feedback of the selections made for example, touch vibrations, scroll clicks, slide vibrations, and/or release based on the gesture movements made by the user for making or receiving calls.

Figure 3E:

Referring to FIG. 3E, the user may use click and slide right or left, click and slide up or down to navigate through increase or decrease follow distance, increase or decrease auto-speed, or increase or decrease auto-speed. The user interacts by performing any of the mentioned gestures on the right user interface 202 provided on the steering wheel 200. In turn, the user interface 202 provides visual and audio indications of the selections made by the user. In some cases, the user interface 202 may additionally provide haptic feedback of the selections made for example, scroll gradual click, slide vibrations, and/or release based on the gesture movements made by the user.

Figure 3F:
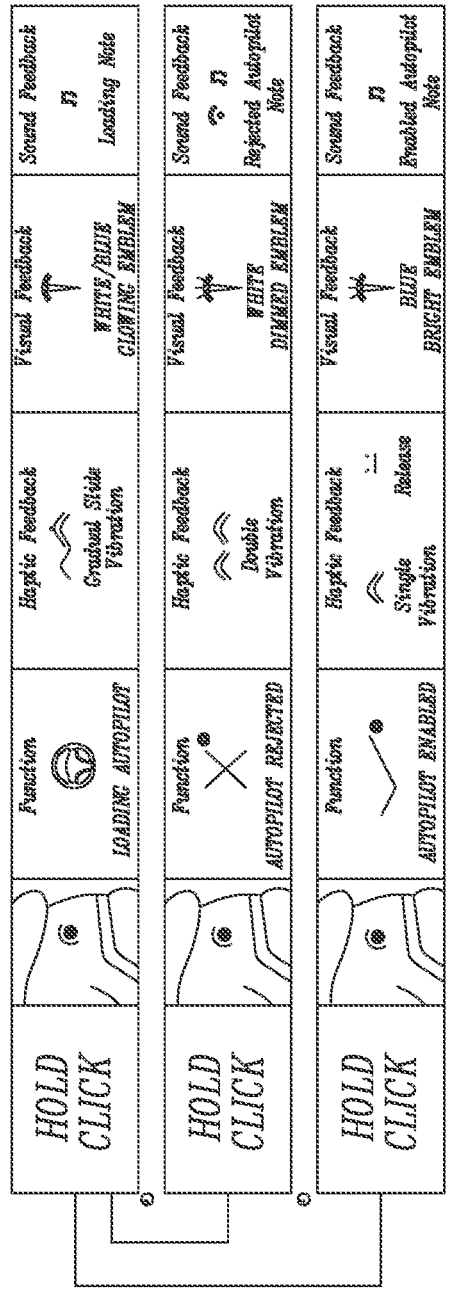

Referring to FIG. 3F, the user may use hold click gesture on the right user interface 202 provided on the steering wheel 200 for loading, rejecting, or enabling auto-pilot mode. The user interface 202 provides visual indications, for example, the illuminated badge 206, and/or audio indications of the selections made by the user. In some cases, the user interface 202 may additionally provide haptic feedback of the selections made for example, scroll gradual click, slide vibrations, and/or release based on the gesture movements made by the user for engagement of auto-pilot mode. It should be noted that the functionalities and mappings of the user gestures to the control of these functionalities is provided herein on an exemplary basis and does not limit the scope of the present description.

Figure 4:
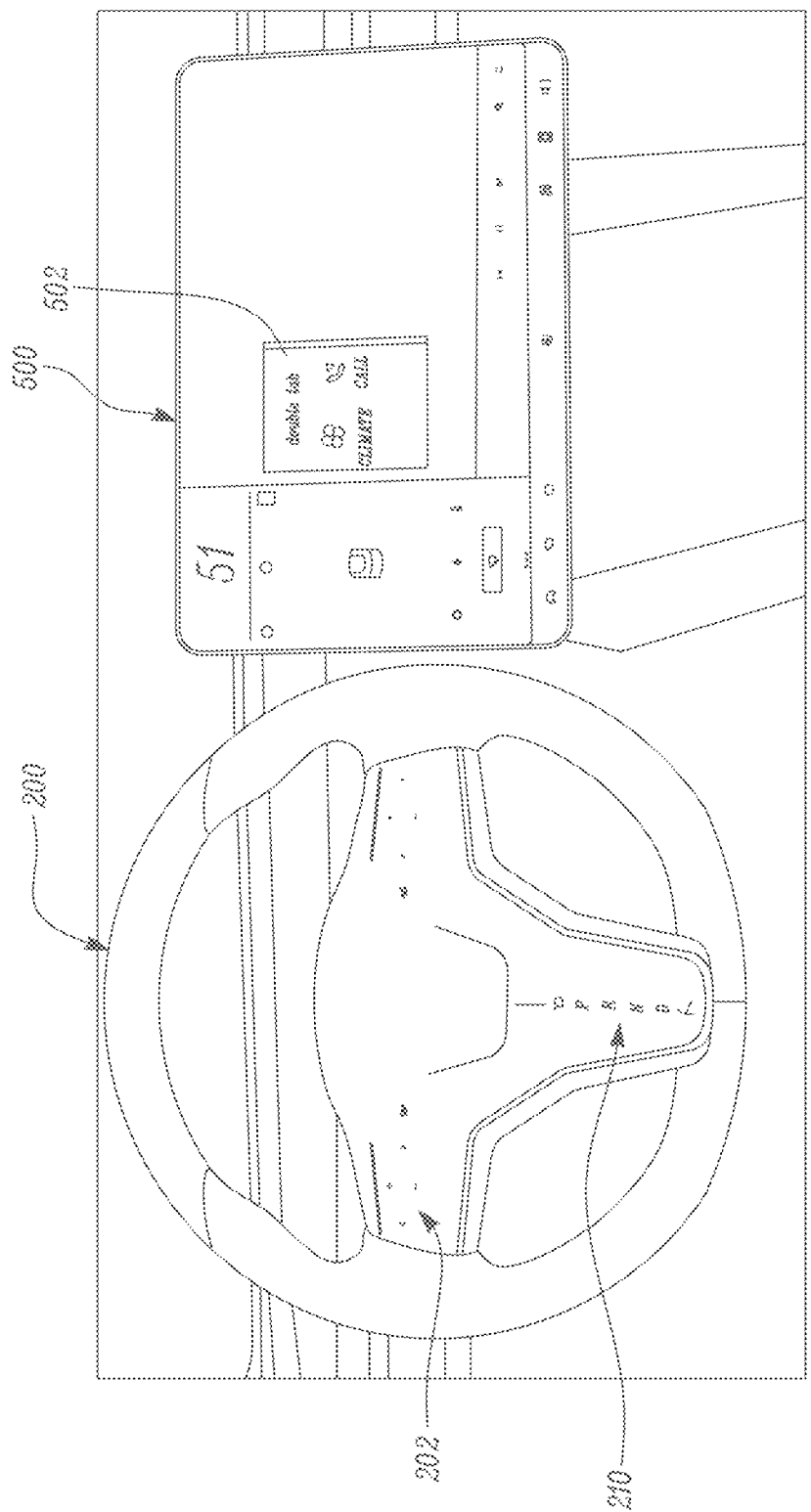
FIGS. 4 and 5 illustrates various displays provided by a peripheral console positioned near the steering wheel according to certain embodiments of the invention.
Figure 5:
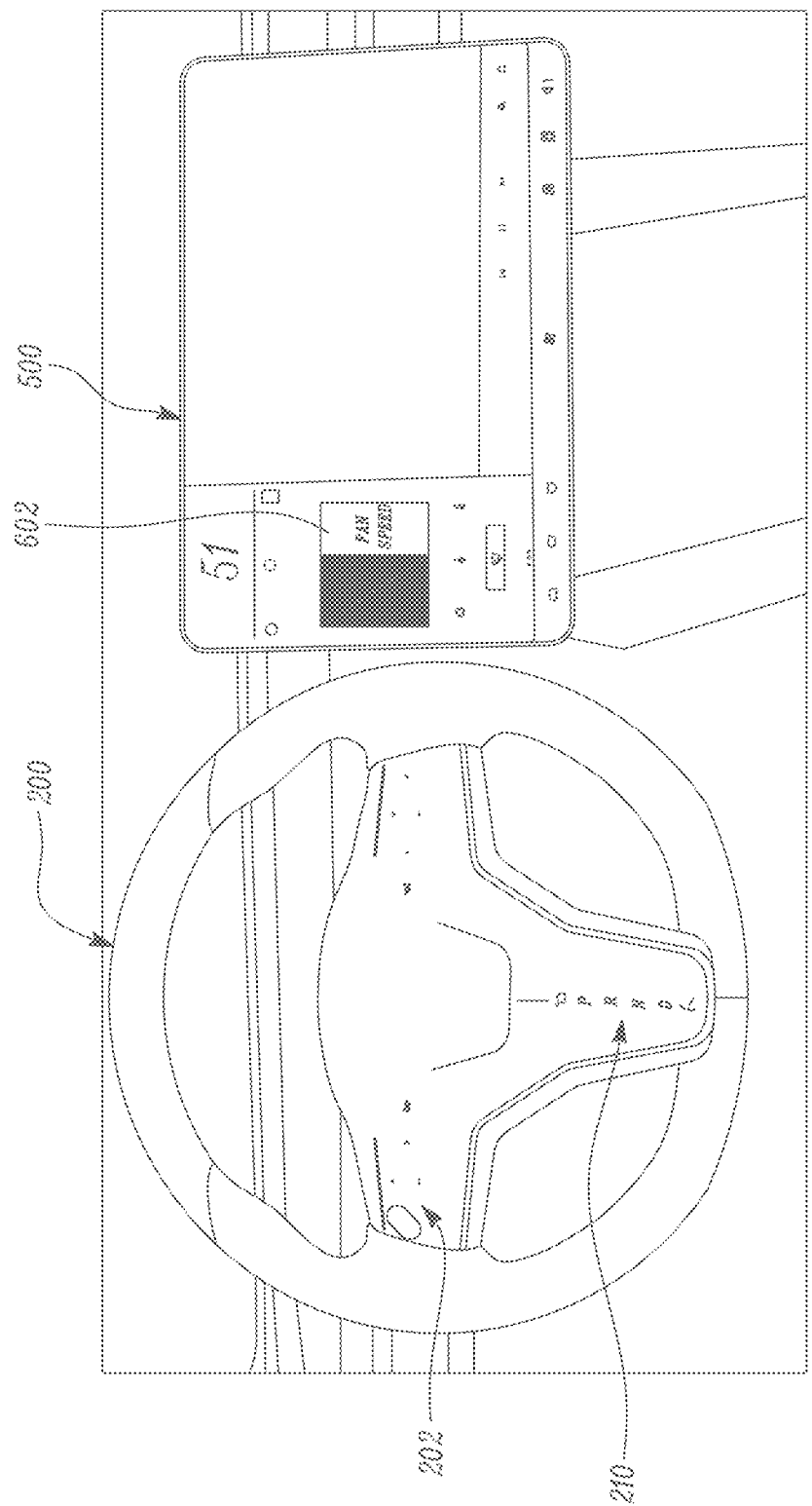

In some embodiments, as shown in FIGS. 4 and 5, a peripheral console 500 may be provided in association with the user interface 202 of the steering wheel 200. More particularly, the peripheral console 500 is positioned such that the peripheral console 500 lies proximate to the steering wheel 200 and can be easily viewed by the driver of the vehicle 100 as he faces frontwards, without requiring the driver to re-orient himself. The peripheral console 500 may be linked to the steering wheel 200, such that the gesture movements recognized by the steering wheel 200 may further cause appropriate visual outputs to be generated on the peripheral console 500. Hence, the peripheral console 500 may display different visual feedback associated with the navigation through the menu of controls with respect to the vehicle 100 or the devices in communication with the vehicle 100.

The information provided by the peripheral console 500 may be presented to the user in a rudimentary, basic or easy to interpret format, without requiring the user to put in effort to the decipher the information. Referring to FIG. 5, an exemplary such notification 502 provided on the peripheral console 500 is shown. The notification 502 includes an illustration depicted on the peripheral console 500 that is based on the gesture movements recognized by the user interface 202 of the steering wheel 200. In this example, the user is provided the option of selecting between a climate function and a call function.

Alternatively, the notification 602 provided by the peripheral console 500 may be a block of color. For example, as shown in FIG. 6, the system provides the notification 602 of a current fan speed selected by the user in the form of a block of color, such that an area of the block of color increases or decreases proportionately with an increase or decrease in the fan speed as indicated by user gestures. A person of ordinary skill in the art will appreciate that the notifications 502, 602 and displays provided herein are exemplary and do not limit the scope of the present disclosure. The depiction of the notification 502, 602 on the peripheral console 500 may be provided as supplementary visual aide to the visual, auditory, and/or haptic feedback provided by the user interface 202 of the steering wheel 200.

It should be noted that a form factor of the steering wheel 200 is not limited to that shown in the accompanying figures and description. The steering wheel 200 may be embodied as a yoke without deviating from the scope of the present disclosure. Further, the mapping of the functionality and the respective output in the form of visual indicators, visual, auditory, and/or haptic feedback, and general navigation through the menu controls may be customizable by the user and is not limited to that described herein. For example, a user profile may be created for each of the users, such that the user may choose to personalize some or all the functionality mappings to customize the experience in interacting with the user interface 202 of the steering wheel 200. In some cases, an over-the-air (OTA) update is used to add, subtract, or alter the inputs or haptic feedback. For example, after the vehicle is delivered to user, an OTA update may alter the rectification or adjustment of a click force or scroll feeling associated with a pressure sensitive component. Further, an OTA update may change the input gesture associated with functionality from one gesture to another, such as from a double click to double tap, from swipe to slide, or another change. OTA updates open possibilities to adjust haptic feedback and gesture inputs, including based on versatile customer data after vehicles are delivered to customers or based on driver feedback. Depending on the level of driver-assist or autonomous-driving functionality of the vehicles, the OTA updates have different inputs or haptic feedback. For example, when a vehicle supports autonomous driving, the inputs may include more inputs requiring more additional gestures. The inputs may access functionality that would be too distracting when driven by a human driver, even with driver-assist functionality, such as television or other display, or multimedia functionality. In embodiments, the input may be handwriting or other complex gestures.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. An interactive user interface for a vehicle comprising:
   a steering wheel including:
      a user interface disposed on a surface of the steering wheel, the user interface configured to respond to user gesture movements relating to selection and navigation of a control menu relating to a function of the vehicle, wherein the user interface is further configured to provide a haptic and audio feedback in response to a recognized user gesture movement relating to navigation of the control menu,
      wherein the steering wheel is configured to determine via a proximity sensor, that a user digit is approaching the user interface and, in response, provide visual feedback.

2. The interactive user interface of claim 1 further including a display configured to provide a notification in the form of at least one of a symbol or a color block based on the user gesture movements provided on recognized by the user interface.

3. An interactive user interface for a vehicle A vehicle comprising:
   a display configured to provide a control menu relating to a function of the vehicle; and
   a steering wheel including:
      a user interface disposed on a surface of the steering wheel, the user interface configured to receive and recognize user gesture movements relating to selection and navigation of a control menu relating to a function of the vehicle, wherein the user interface is further configured to provide haptic and audio feedback in response to recognizing a user gesture movement relating to navigation of the control menu; and
      a first visual indicator,
      wherein the steering wheel is configured to determine via a proximity sensor, that a user digit is approaching the user interface and, in response, activate the first visual indicator.

4. The vehicle of claim 3, wherein the user interface includes at least one of a trackpad, a touch pad, or a set of buttons.

5. The vehicle of claim 3, wherein the user interface is further configured to provide a visual feedback in response to recognizing a user gesture movement relating to navigation of the control menu.

6. The vehicle of claim 3, wherein an amplitude of the haptic feedback changes based on any one of an increase or decrease in functionality of the function of the vehicle.

7. The vehicle of claim 6, wherein the haptic feedback provided by the user interface includes one or more of a slide vibration, a hold vibration, a click, a release, a touch vibration, a scroll click, a single vibration, or a double vibration.

8. The vehicle of claim 3 further including a badge disposed on a front face of the steering wheel, wherein the badge is configured to provide illumination indicative of selection of autopilot functionality via the user interface.

9. The vehicle of claim 3, further including a plurality of second visual indicators provided on the user interface, the plurality of second visual indicators configured to provide illumination indicative of changes in the function of the vehicle corresponding to user gesture movements recognized by the user interface.

10. The vehicle of claim 3, wherein the user gesture movements recognized by the user interface include one or more of a swipe, double tap, hover, slide, click, hold click, or multi-diagonal slide.

11. The vehicle of claim 3, wherein the display is further configured to provide a notification in the form of at least one of a symbol or a color block based on user gesture movements recognized by the user interface.

12. An interactive user interface for a vehicle comprising:
    a steering wheel including:
       a user interface disposed on a surface of the steering wheel, the user interface configured to receive and recognize user gesture movements relating to selection and navigation of a control menu relating to a function of the vehicle, wherein the user interface is further configured to provide haptic and audio feedback in response to recognizing a user gesture movement relating to navigation of the control menu; and
       a first visual indicator,
       wherein the steering wheel is configured to determine via a proximity sensor, that a user digit is approaching the user interface and, in response, activate the first visual indicator.

13. The interactive user interface of claim 12, wherein the user interface includes at least one of a trackpad, a touch pad, or a set of buttons.

14. The interactive user interface of claim 12, wherein the user interface is further configured to display a visual feedback in response to recognizing a user gesture movement relating to navigation of the control menu.

15. The interactive user interface of claim 12, wherein the user gesture movements recognized by the user interface include one or more of a swipe, double tap, hover, slide, click, hold click, or multi-diagonal slide.

16. The interactive user interface of claim 12, wherein an amplitude of the haptic feedback changes based on any one of an increase or decrease in a functionality of the function of the vehicle.

17. The interactive user interface of claim 12 wherein the haptic feedback provided by the user interface includes one or more of a slide vibration, a hold vibration, a click, a release, a touch vibration, a scroll click, a single vibration, or a double vibration.

18. The interactive user interface of claim 12 further including a badge disposed on a front face of the steering wheel, wherein the badge is configured to provide illumination indicative of selection of autopilot functionality via the user interface.

19. The interactive user interface of claim 12, further including a plurality of second visual indicators provided on the user interface, the plurality of second visual indicators configured to provide illumination indicative of changes in the function of the vehicle corresponding to user gesture movements recognized by the user interface.

20. The interactive user interface of claim 12 further including a display configured to provide a notification in the form of at least one of a symbol or a color block based on user gesture movements recognized by the user interface.

\* \* \* \* \*